A. RANK.
Grave Guards.

No. 140,728.  Patented July 8, 1873.

Witnesses.  Amos Rank
Wm Smoney  per James H Whitney
Ingersoll Lockwood  Atty

UNITED STATES PATENT OFFICE.

AMOS RANK, OF SALEM, OHIO.

IMPROVEMENT IN GRAVE-GUARDS.

Specification forming part of Letters Patent No. 140,728, dated July 8, 1873; application filed September 12, 1872.

*To all whom it may concern:*

Be it known that I, AMOS RANK, of Salem, in the county of Columbiana and State of Ohio, have invented an Improvement in Guards for Graves, &c., of which the following is a specification:

This invention is designed to furnish a simple and effective means of insuring the permanent symmetry of graves or burial-mounds, by guarding them from the crumbling down of their sides or edges, either from the effects of rains, frosts, or other natural agencies, or from trampling or the like; and also to provide a means of retaining the usual head and foot stones, and when desired, the posts of a fence or railing more securely and permanently in position than when set in the ground in the usual manner. To this end the invention consists in a molded guard, to be placed around the grave to be guarded, and provided with post-holes and head or foot stone sockets, either or both, as may be preferred.

Figure 1:
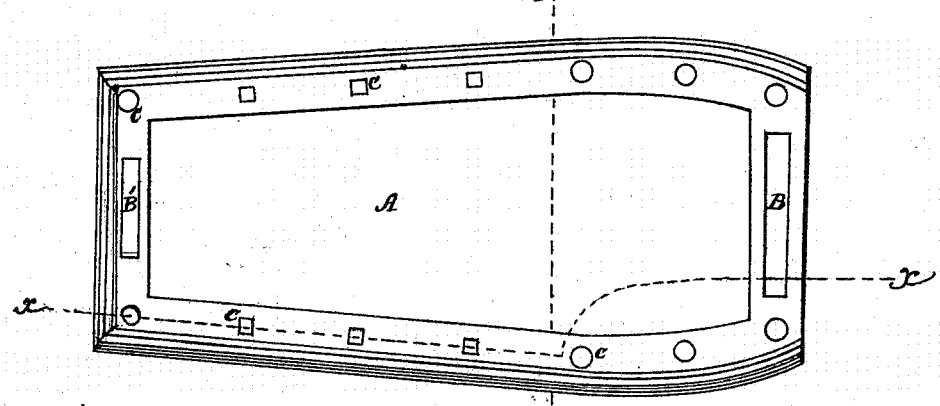
Figure 2:
Figure 3:
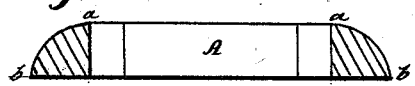

Figure 1 is a plan view of a guard for graves, constructed according to my invention. Fig. 2 is a longitudinal vertical section taken in the line $x\ x$ of Fig. 1. Fig. 3 is a vertical transverse section taken in the line $y\ y$ of Fig. 1.

The guard is made with a circumferential contour, more or less closely corresponding to that of the grave to which it is to be applied, as indicated in Fig. 1. It is to be formed in a mold of any suitable form, and made either of metal cast in such mold, or of any artificial stone or cement, or equivalent material, shaped therein, and subsequently allowed or caused to harden. Its outermost portions should be made sloping, as shown more fully at $a\ b$ in Fig. 3, in order that a symmetrical and pleasing appearance may be given to the edges of the grave. The central or open portion A of the guard, when the latter is in use, is filled with the earth constituting the upper portion of the grave or mound, the surface of this earth being, preferably, rounded somewhat above the level of the upper surface of the guard, and sodded over or planted with flowers and shrubs. The guard thus arranged with reference to and surrounding that portion of the grave above the adjacent level, effectually supports the edges of the same, and retains the mound in the symmetrical shape originally given it. Formed vertically in one end of the guard is a rectangular slot or socket, B, of such size and shape as to receive and firmly hold the head-stone usually set upon graves, and in the opposite end of the guard is, when desired, a similar slot or socket, B', for the reception, in like manner, of a stone for the foot of the grave. Provided vertically in the guard at the sides, and, when required, at the ends thereof, are holes, C, constituting sockets for the reception of the lower ends of the posts of a fence or railing, which may be constructed to protect the flowers, &c., upon the grave from grazing or other animals having the run of the grave-yard or burial-place.

What I claim as my invention is—

1. The grave-guard, made of molded or cast material, and constructed with a socket or sockets for holding the head-stone or head and foot stones of the grave, substantially as and for the purpose specified.

2. The grave-guard made of molded or cast material, and constructed with holes or sockets for the reception of the posts of a fence or railing, substantially as and for the purpose specified.

AMOS RANK.

Witnesses:
 ORLANDO RANK,
 DANIEL CRUMRIER.